United States Patent [19]

Bellehache et al.

[11] Patent Number: 4,592,719

[45] Date of Patent: Jun. 3, 1986

[54] APPARATUS FOR MANUFACTURING PLASTIC BOTTLES FROM MOLDED HOLLOW PREFORMS

[75] Inventors: Pierre Bellehache; Paul La Barre, both of Sainte Adresse, France

[73] Assignee: Societe de Machines pour la Transformation des Plastiques, Paris, France

[21] Appl. No.: 712,497

[22] Filed: Mar. 18, 1985

[30] Foreign Application Priority Data

Mar. 16, 1984 [FR] France .................. 84 04248

[51] Int. Cl.⁴ .................................................. B29C 49/42
[52] U.S. Cl. ........................................ 425/526; 34/20; 34/92; 425/534; 432/80
[58] Field of Search ............ 425/526, 534, 547; 34/20, 92; 432/80; 264/571, 572, 523, 542, 537

[56] References Cited

U.S. PATENT DOCUMENTS

| | | | |
|---|---|---|---|
| 3,048,889 | 8/1962 | Fischer et al. | 264/542 |
| 3,882,213 | 5/1975 | Uhlig | 425/526 |
| 4,209,290 | 6/1980 | Rees et al. | 425/526 |
| 4,373,891 | 2/1983 | Kishida et al. | 264/535 |
| 4,376,090 | 3/1983 | Marcus | 264/537 |

FOREIGN PATENT DOCUMENTS 2059917  8/1969  France ................ 425/534

Primary Examiner—Willard E. Hoag
Attorney, Agent, or Firm—Sughrue, Mion, Zinn, Macpeak and Seas

[57] ABSTRACT

Upon leaving the mold, plastic bottle preforms are engaged internally and/or externally by pneumatic suction grips which form an annular chamber (15, 27) through which atmospheric cooling air is circulated. This increases the rate of production of the preforms by cooling them during handling, rather than separately at a discrete cooling station.

9 Claims, 8 Drawing Figures

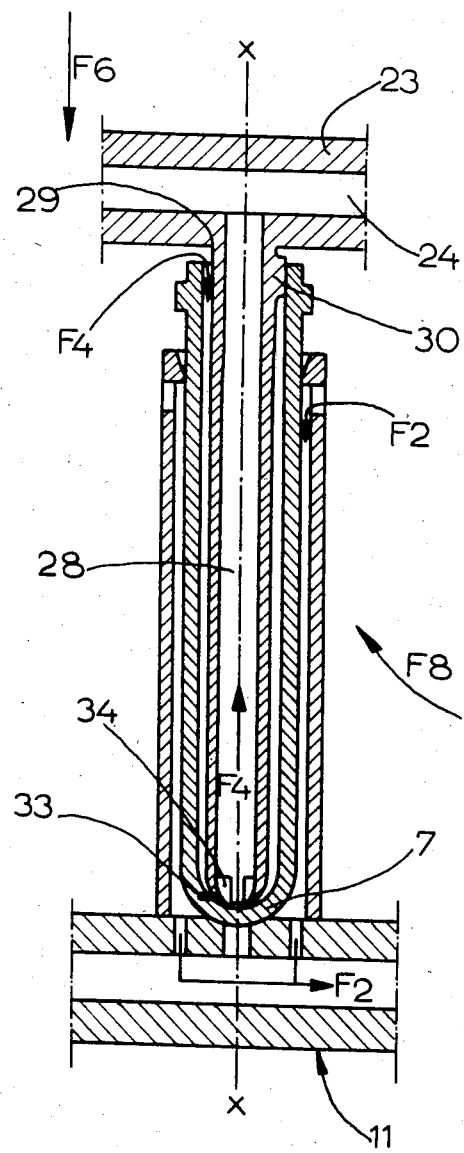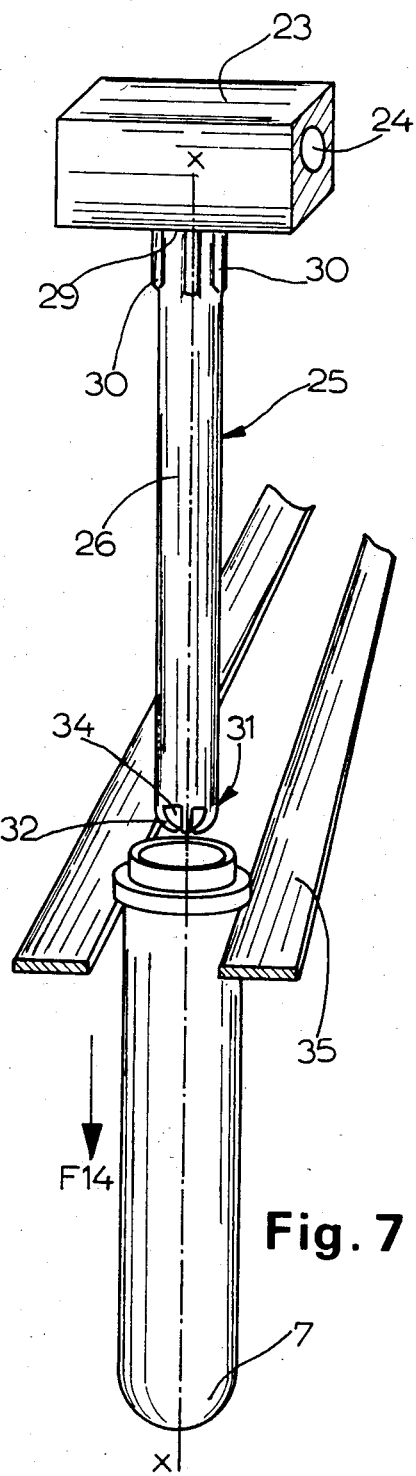
Fig. 6
Fig. 7

APPARATUS FOR MANUFACTURING PLASTIC BOTTLES FROM MOLDED HOLLOW PREFORMS

BACKGROUND OF THE INVENTION

This invention pertains to a method and apparatus for manufacturing plastic bottles from molded hollow preforms. It can be applied particularly to facilities for the manufacture of plastic bottles by the biaxial stretching of the material, beginning from preforms in the shape of a hollow cylinder closed at one end. The preforms may be made in multi-cavity molds into which plastic material is injected around a central core. Each such mold is composed of two halves that are separated when the injection is completed in order to release the preforms, which resemble test tubes in shape.

In the conventional process, after removal from the mold the preforms are immediately transferred to a cooling platform that forms part of the machine to which the mold belongs, and which statically cools the preforms inside and out using open ventilation. Such cooling is indispensable if the preforms are to keep their shape during later handling operations.

The current method of cooling the preforms considerably reduces the production tempo of the molds in which they are produced because of the relatively long period of time the preforms spend on the stationary cooling platform that lies downstream from the molds and upon which every preform leaving the molds must be cooled before being moved off to its final destination. This method of cooling creates a bottleneck downstream from the injection molds.

Once the cooling operation is completed, pneumatic suction grips remove the preforms from the cooling platform and deliver them to their final destination, while a new run of preforms is injected into the mold. During such handling two types of pneumatic grips may be used, with one gripping the preform from the outside and the other taking it from the inside, turning it over and arranging it vertically on a conveyor.

SUMMARY OF THE INVENTION

In order to eliminate unproductive cooling time, this invention enables the preforms to be cooled directly on the pneumatic grips, beginning with the point at which the preforms are gripped from the mold up to their final destination point, where they may be released on a discharge conveyor. In implementation, the preforms and their suction grips together form annular chambers through which atmospheric air is drawn to cool the surfaces of the preforms.

BRIEF DESCRIPTION OF THE DRAWINGS

FIG. 6 is a view analogous to FIGS. 2 and 3, showing a preform being carried by both an interior and an exterior gripper simultaneously;

FIG. 7 is a schematic perspective view of an interior gripper depositing a cooled preform on a conveyor.

DETAILED DESCRIPTION OF THE PREFERRED EMBODIMENTS

This invention is applied in facilities for the injection or extrusion blowing of plastic preforms in molds, with the preforms being subsequently used for the manufacture of bottles according to known processes, e.g. biaxial orientation. Before being stored or sent to the location at which the bottles are made, the preforms must be cooled upon leaving the mold so that they will keep their shape and no longer be in thermoplastic condition. The present invention provides for the cooling of the preforms immediately upon their extraction from the mold. The preforms are cooled on the pneumatic grips used to extract and handle them.

Figure 1:
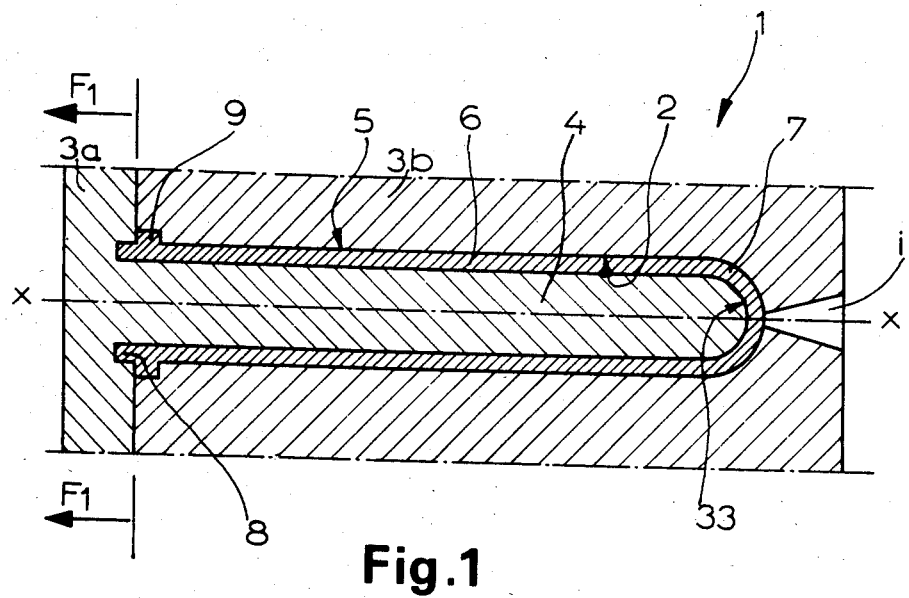
FIG. 1 is a schematic cross-section of part of a plastic preform mold.

The preforms are generally produced in multi-cavity molds. FIG. 1 is a partial view of a mold 1 having multiple cavities 2, only one of which is visible in the figure. The mold can be separated into two parts or mold halves 3a and 3b along a plane perpendicular to the axis x—x of a cylindrical core 4 integtral with mold-half 3a. The two mold halves can be separated from each other by displacement along axis x—x, e.g., in the direction indicated by arrows F1.

When molten plastic is injected around cylindrical core 4 through injection port i of cavity 2 of the closed mold, a preform 5 is produced consisting of a hollow cylindrical body 6 closed at one end by a hemispherical bottom 7, with the other end remaining open as neck 8 and having at least one coaxial flange 9. When the preform injection is complete the mold halves 3a and 3b are separated until hemispherical bottom 7 of the preform, borne on core 4, clears mold-half 3b.

Figure 2:
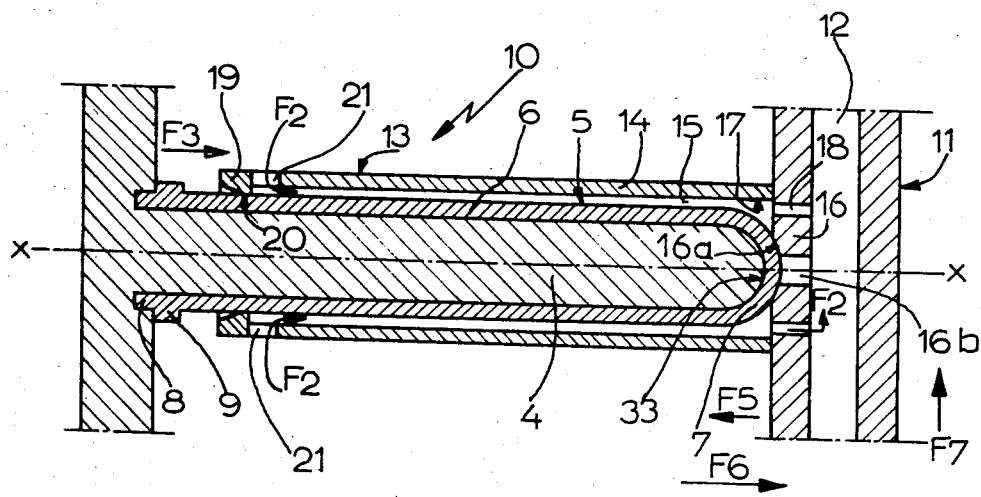
FIG. 2 is a schematic cross-section of an exterior gripper equipped with a circuit for cooling the exterior of a preform according to the invention.

FIG. 2 shows an apparatus 10 for gripping the preforms 5 from the outside to remove them from core 4 of the mold and to simultaneously transfer and cool them. The apparatus 10 comprises a mobile base 11 provided within with an internal suction conduit 12 and with at least as many exterior grippers as there are cavities 2 in the mold. Each exterior gripper 13 comprises a tubular body 14 that is coaxial with axis x—x of a preform 5 inserted into the gripper. Tubular body 14 is perpendicular to the base 11 that supports it.

According to the invention, the interior diameter of tubular body 14 is slightly greater than the outer diameter of cylindrical body 6 of the preform so as to form around the latter an annular cooling chamber 15 coaxial with axis x—x. The end of tubular body 14 is closed off by a base 16 having a central spherical impression 16a containing a central gripping aperture 16b. The base 16 centers and supports the preform. In proximity to inner wall 17 of the tubular body, base 16 contains suction holes 18 distributed circumferentially so as to connect annular cooling chamber 15 with suction conduit 12. The end of tubular body 14 opposite base 16 has a tapered fitting 19 coaxial with axis x—x and converging inwardly to facilitate the engagement of the preform 5 within the tubular body. The smallest diameter 20 of fitting 19 is slightly greater than the outer diameter of the preform to guide the latter and to form a non-hermetic seal for annular chamber 15. Close to tapered fitting 19, the tubular body 14 is provided with circumferentially distributed breather ports 21.

The breather ports, annular chamber 15, and suction holes 18 are sized so as to obtain, in combination with the power of a suction pump (not shown) connected to conduit 12, an intensive flow of air in the direction of arrows F2 drawn in through ports 21 and along the outer surface of the preform. The flow of the aspirated air is transitory and/or preferably turbulent to maximize the heat exchange between the outer surface of the preform and the air to thereby rapidly cool the preform. The direction of air flow also serves to create a suction current or effect that draws the preform toward base 16 of tubular body 14 in the direction of arrow F3 and holds it against spherical impression 16a while it is being cooled and transported.

The interior gripping means 22 shown in FIGS. 3 through 7 comprises a mobile base 23 provided with a central suction conduit 24 upon which interior grippers 25 are fastened, only a single such gripper being shown. Each gripper 25 has a cylindrical body 26 whose outer diameter is smaller than the inner diameter of the preform, thus forming an annular chamber 27 coaxial with axis x—x.

Interior duct 28 runs the entire length of body 26 and leads into the central suction conduit. The overall length L of body 26 is slightly greater than the depth of the preform in order to leave a space J sufficient to prevent neck 8 of the preform fitted over the gripper from coming into contact with base 23. The body 26 is perpendicular to and integral with base 23 at one end 29. This end is provided on the outside with guide ribs 30 parallel to axis x—x and regularly distributed over its circumference to form breather ports 36. The opposite end 31 of the body 26 extends in arched prongs 32 that converge uniformly upon axis x—x. Their outer surface matches the internal, concave, contact contour 33 of bottom 7 of the preform that is to be picked up. Air passages 34 are thereby formed between the prongs, connecting annular chamber 27 with central duct 28. End 31 may be detachable from body 26, so that a variety of shapes can be applied, thus accommodating various preform bottoms. The essential point is to present a support surface that is compatible with the internal contact surface 33 of the preform, while simultaneously allowing for the free circulation of air around the preform in the direction of arrows F4. The air is drawn successively through space J, breather ports 36, annular chamber 27, passages 34, central duct 28 and suction conduit 24, which are sized in proportion to the power of a suction pump connected to conduit 24 (but not shown) so as to set up a transitory and/or preferably turbulent flow of air. This type of flow favors heat exchange between the aspirated air and the preform, thus providing for intensive and rapid cooling. The preform benefits simultaneously from the type of flow and from its direction F4, which holds it by suction upon male gripper 25.

The number of interior grippers 25 on base 23 is equal to the number of female grippers 13 on base 11. They are spaced in the same plane with respect to base 23 and at a regular axial distance, matching the exterior grippers 13 on base 11.

Figure 8:
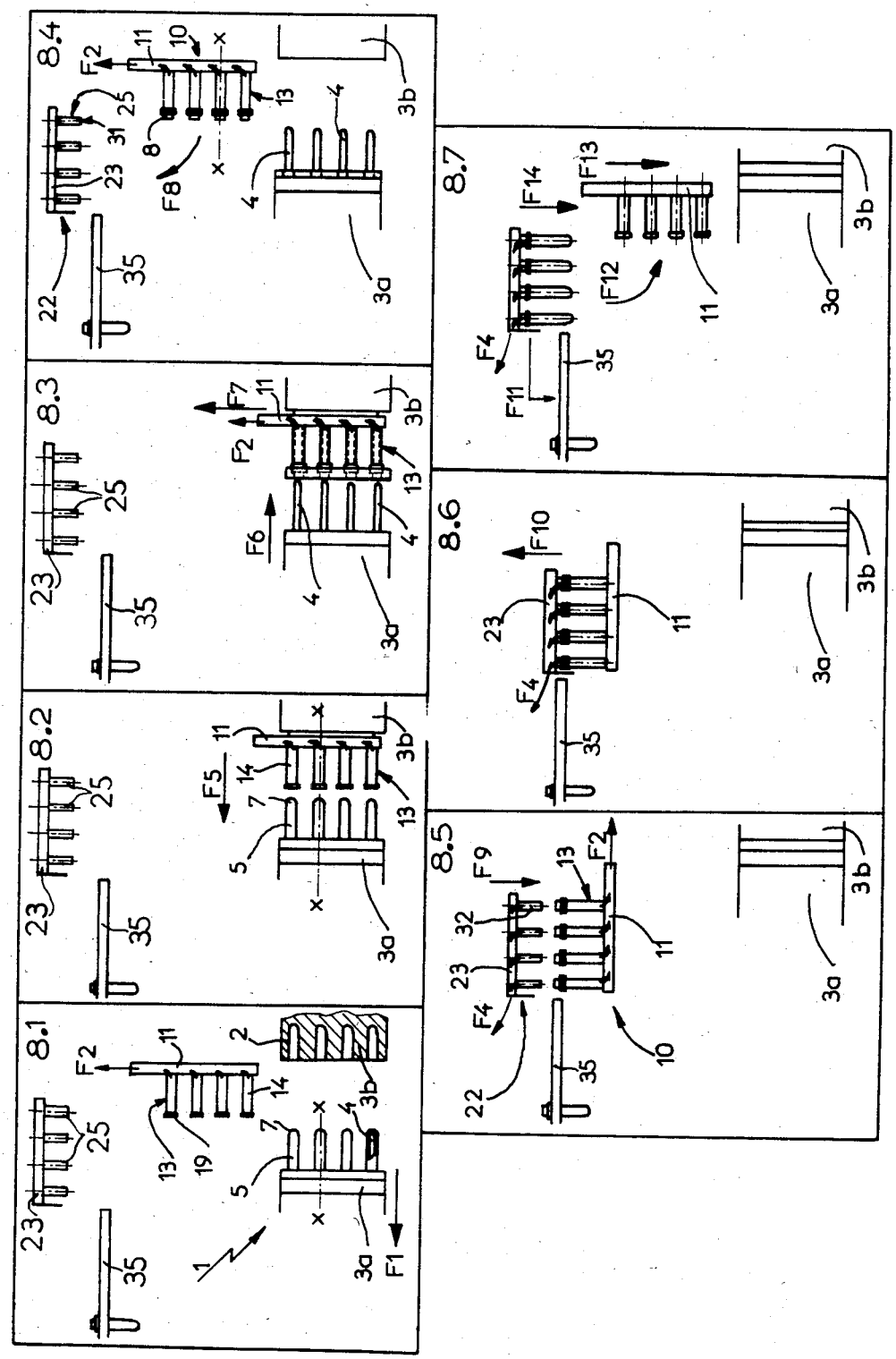
FIG. 8 is an overall schematic diagram showing the cooperation of the interior and exterior grippers according to the invention.

In operation with reference to FIG. 8, in order to enable preforms 5 to be gripped on cores 4 after moldhalf 3a has been withdrawn in the direction of arrow F1 (FIG. 8.1), known means are used to position base 11 opposite mold-half 3a (FIG. 8.2). The fitting 19 on each exterior gripper 13 faces the hemispherical bottom 7 of each corresponding preform, still held to its respective core 4. When exterior grippers 13 are in axial alignment with the axes x—x of their respective preforms, frame 11 is moved forward in the direction of arrow F5 toward mold-half 3a until the preforms are fully and coaxially inserted within the respective cylindrical bodies 14, with their bottoms 7 reaching and coming to rest against spherical impressions 16a of bottoms 16 (FIG. 2). Suction is then applied and base 11 is withdrawn in the direction of arrow F6 (FIG. 8.3) to withdraw preforms 5 from their cores 4 and proceed with their simultaneous removal and cooling.

The mold is reclosed by rejoining mold-halves 3a and 3b, readying it for the next molding operation. Meanwhile, the exterior grippers continue their transfer motion in the direction of arrow F7, while simultaneously cooling the preforms.

In the course of such motion, before the outer surfaces of the preforms are completely cool, they are gripped from within by interior gripping means 22, which have the function of continuing to transfer the preforms to their final destination while simultaneously cooling their inner surfaces.

Figure 3:
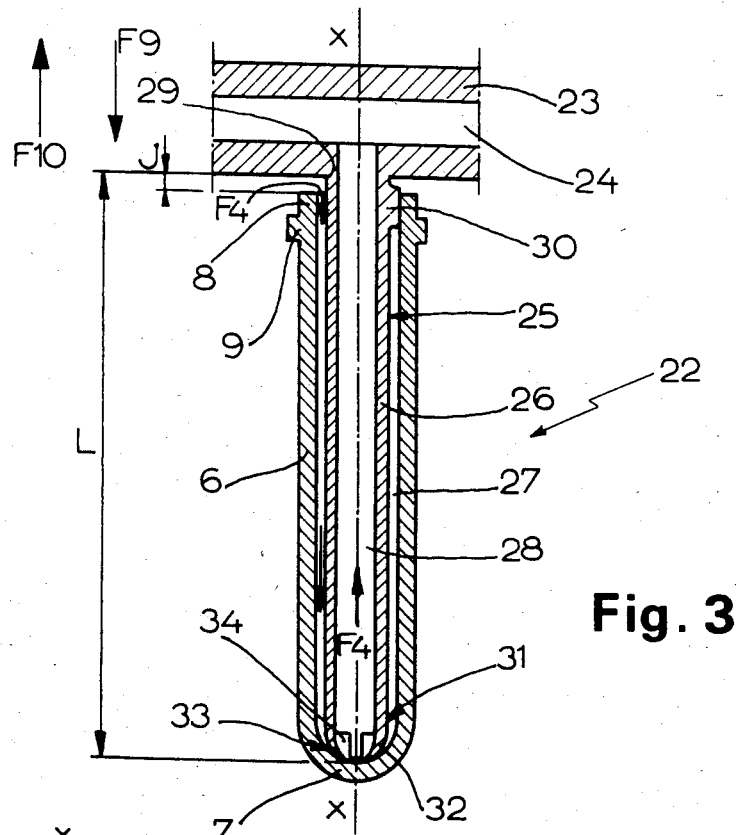
FIG. 3 is a view analogous to FIG. 2 and represents an interior gripper equipped with a circuit for cooling the interior of a preform according to the invention.
Figure 4:
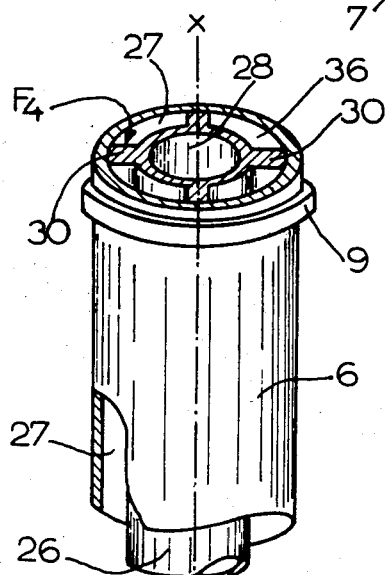
FIG 4 is a partial perspective view, larger in scale than FIG. 3, of one end of an interior gripper carrying a preform.
Figure 5:
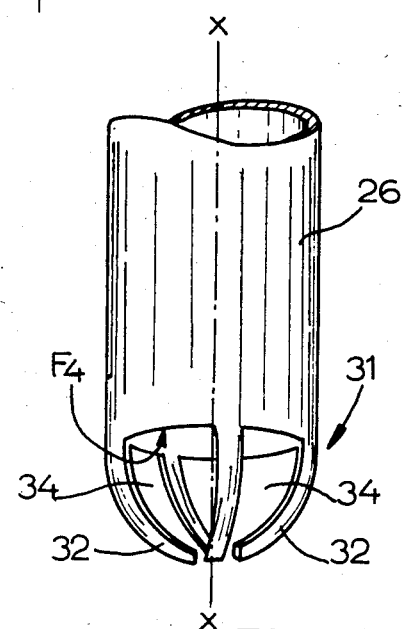
FIG. 5 is a partial perspective view, on the same scale as FIG. 4, of the other end of an interior gripper.

According to FIG. 8.4, to effect the transfer of the cooling preforms from exterior grippers 13 to interior grippers 25, base 11 of exterior gripping means 10 tilts in a vertical plane as indicated by arrow F8, bringing necks 8 of the preforms into axial alignment with ends 31 of the interior grippers. The latter are then axially engaged in the direction of arrow F9 (FIG. 8.5) until arched prongs 32 meet the concave contours 33 of bottoms 7 of the preforms, as shown in FIGS. 3, 6, and 8.6. In this configuration, in which exterior grippers 13 and interior grippers 25 are positioned respectively outside and inside performs 5, the inner cooling of the preforms is begun while the outer cooling is still in progress. Once the process of cooling the outsides of preforms 5 is complete, the suction (and thus the exterior cooling air) for the preforms 5 is suspended. Base 23 supporting the preforms is withdrawn in the opposite direction, as indicated by arrow F10, until the preforms held by the interior grippers are totally disengaged from the exterior grippers. Thus held and cooled by the interior grippers, as shown in FIG. 8.7, the preforms can be moved toward their final destination in the direction of arrow F11, while exterior gripper means 13 return to mold 1 in the direction of arrows F12 and F13 to extract the new preforms produced in the mold during the process of cooling and transferring the preceding preforms. A new cycle thus begins while the interior gripping means continue to cool the insides of the previously produced preforms. Once cool, these are deposited, neck up, onto a conveyor 35 as indicated by arrow F14 (FIGS. 8.7 and 7).

By virtue of the process just described, it is possible to obtain a rate of production more than 20% higher than that obtained using known processes, not only because of the intensive cooling of the preforms tied to the special flow conditions under which the cooling fluid circulates around the preforms in the means that employ the process of the invention, but also because the cooling operation takes place directly on the handling grippers without slowing the rate of production of the molds that produce the preforms.

In the prior art the preforms are cooled by open ventilation on known cooling platforms by heat exchange using a laminar flow of air (Reynolds number less than or equal to 2,000), whereas in this invention the flow of the cooling air around and inside the preforms is of the transitory type and is close to turbulent conditions (Reynolds number greater than 8000). This enables accelerated heat exchange and reduces the cooling time by more than 20%.

Another advantage of cooling the preforms directly on the grippers is that this eliminates the cooling platform needed in known facilities where each new injection of preforms 5 in molds 1 must be delayed until the previously injected preforms have been cleared from the cooling platform. Under the process of the invention, preforms 5 are produced nearly without interruption.

What is claimed is:

1. An apparatus for the manufacture of hollow, molded, cylindrical plastic preforms closed at one end, for subsequent expansion to form bottles, characterized by:
   (a) separate interior and exterior cylindrical pneumatic suction grips for engaging hot preforms and removing and transporting them away from a mold, said suction grips forming annular chambers with interior and exterior surfaces of the preforms, and
   (b) means for circulating air through said chambers to cool the preforms simultaneously with their removal and transportation away from the mold.

2. The apparatus of claim 1, wherein outlets of the annular chambers are connected to suction conduits and inlets of the chambers communicate with the atmosphere through breather ports.

3. The apparatus of claim 2, wherein the inner diameter of a tubular body of each exterior grip is greater than the outer diameter of a preform body, thus forming one of said annular chambers for cooling the outer surface of the preform.

4. The apparatus of claim 3, wherein a suction conduit (12) communicates with said one annular chamber through suction ports in a base, said ports being distributed circumferentially and in proximity to an inner surface of the tubular body of the exterior grip.

5. The apparatus of claim 4, wherein the air breather ports are in the tubular body of the exterior grip and are distributed circumferentially around the body of the preform, in the proximity of a tapered fitting that eases the insertion of the preform into the exterior grip.

6. The apparatus of claim 2, wherein the outer diameter of a cylindrical body of each interior grip is less than the inner diameter of the preform, thus forming another of said annular chambers for cooling the inner surface of the preform.

7. The apparatus of claim 6, wherein the cylindrical body of the interior grip is longer than the preform and forms a space (J) between a base that supports the interior grip and the edge of a neck of the preform.

8. The apparatus of claim 7, wherein an end of the cylindrical body of the interior grip comprises arched prongs that form air passages and serve to support a hemispherical bottom at the closed end of the preform.

9. The apparatus of claim 8, wherein the air breather ports are delimited by guide ribs distributed circumferentially around the cylindrical body in proximity to the base.

* * * * *